United States Patent Office 2,971,009
Patented Feb. 7, 1961

2,971,009

3,7-DIOXYGENATED 3a-METHYL-3-BENZ[e]IN-DANECARBOXYLIC ACIDS AND LACTONES

Robert R. Burtner, Skokie, Ill., assignor to G. D. Searle & Co., Chicago, Ill., a corporation of Delaware No Drawing. Filed Mar. 5, 1959, Ser. No. 797,346

6 Claims. (Cl. 260—343.6)

This invention relates to 3,7-dioxygenated 3a-methyl-3-benz[e]indanecarboxylic acids, lactones corresponding, and processes for the manufacture thereof. More particularly, this invention relates to compounds of the formula

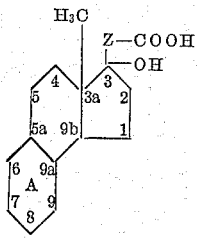

wherein ring A is at least partly aromatic; there is a hydroxy, alkoxy, or oxo substituent in position 7; and Z is an ethynylene, vinylene, or ethylene radical.

The application for Letters Patent securing the invention herein described and claimed is a continuation-in-part of applicant's prior copending application, Serial No. 744,915, filed June 27, 1958, and now abandoned.

Among the compounds comprising this invention are substances of the formula

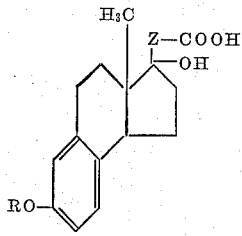

wherein Z is defined as before, and R is either hydrogen or a lower alkyl radical, for example, methyl, ethyl, propyl, isopropyl, butyl, isobutyl, sec-butyl, tert-butyl, pentyl, isopentyl, tert-pentyl, neopentyl, hexyl, isohexyl, heptyl, octyl, or like $C_nH_{2n+1}$ radicals wherein $n$ is a positive integer amounting to less than 9.

Within the ambit of invention also are compounds of the formula

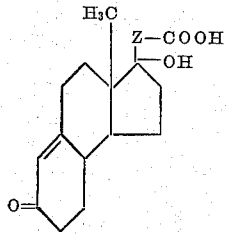

wherein Z has the meaning hereinbefore assigned.

Those skilled in the art will recognize that when Z in the foregoing formulas signifies a vinylene or ethylene radical, the compounds represented are subject to elimination of the elements of water from each molecule and concomitant lactone formation. The resultant lactones, which can be enformulated thus

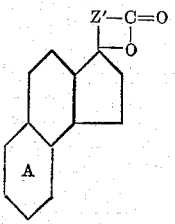

ring A being at least partially aromatic and substituted as set forth in the first paragraph hereof, and Z' standing for —CH=CH— or —CH$_2$CH$_2$—, are substantially equivalent to the corresponding hydroxy acids of this invention for the purposes described. Likewise equivalent to the hydroxy acids hereof are their alkali metal and ammonium salts.

The described 3,7-dioxygenated 3a-methyl-3-benz[e]-indanecarboxylic acids, lactones, and salts are useful because of their valuable pharmacological properties. For example, they manifest a capacity to block the effects of desoxycorticosterone acetate on urinary sodium and potassium. It follows that intermediates whence these products can be obtained, are likewise valuable.

Manufacture of the compounds of this invention proceeds as follows: 3-ethynyl-3-hydroxy-7-methoxy-3a-methyl-3a,4,5,9b-tetrahydrobenz[e]indane, prepared by ethynylation of the corresponding 3-oxo compound in the presence of potassium tert-butoxide, using toluene as solvent, is carboxylated by seriatim treatment with a Grignard reagent and carbon dioxide in ethereal solution to give 3-carboxyethynyl-3-hydroxy-7-methoxy-3a-methyl-3a,4,5,9b-tetrahydrobenz[e]indane, one of the specifically claimed products hereof. This material, in turn, is reduced to 3-(2-carboxyvinyl)-3-hydroxy-7-methoxy-3a-methyl-3a,4,5,9b-tetrahydrobenz[e]indane by hydrogenating either in a medium comprising pyridine, dioxane, and a suspension of palladium on calcium carbonate, or—preferably—in alcohol containing palladium on calcium carbonate which has been preliminarily "poisoned" with lead salt. [See the paper of H. Lindlar, Helv. Chim. Acta, 35, 446 (1952).] Alternatively, when palladium on charcoal is the catalyst employed, hydrogenation affords 3-(2-carboxyethyl)-3 - hydroxy - 7 - methoxy-3a-methyl-3a,4,5,9b-tetrahydrobenz[e]indane. In the latter instance, an amine such as triethylamine is incorporated in the reduction medium to increase solubility. With an amine present (as also under basic conditions generally), the carboxyvinyl and carboxyethyl products of this invention are obtained as salts which preponderantly lactonize on acidification. Reduction of 3-(2-carboxyethyl)-3-hydroxy - 7 - methoxy-3a-methyl-3a,4,5,9b-tetrahydrobenz[e]indane sodium salt with lithium in a mixture of liquid ammonia and tert-butyl alcohol yields, on subsequent acidification, 3-(2-carboxyethyl)-3-hydroxy-3a-methyl - 7 - oxo - 3a,4,5,7,8,9,9a,9b-octahydrobenz[e]-indane lactone. If the lithium ammonia reduction is carried out directly on 3-carboxyethynyl-3-hydroxy-7-methoxy - 3a - methyl-3a,4,5,9b-tetrahydrobenz[e]indane, a mixture of products is obtained, among which 3-(2-carboxyvinyl)-3-hydroxy - 7 - methoxy-3a-methyl-3a,4,5,9b-tetrahydrobenz[e]indane potassium salt can be isolated. Other alkali metal and the ammonium salts aforesaid are obtained by basifying the appropriate hydroxy acid in aqueous solution with a selected hydroxide.

The 3-hydroxy compounds of this invention are derived from the 3-ethers by aluminum chloride cleavage in chlorobenzene medium, and can, in turn, be alkoxylated by reaction with an alkyl halide of choice, according to usual procedures well known in the art.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter set forth, temperatures are given in degrees centigrade (° C.) and relative amounts of materials in parts by weight, except as otherwise noted.

EXAMPLE 1

*3-ethynyl-3-hydroxy-7-methoxy-3a-methyl-3a,4,5,9b-tetrahydrobenz[e]indane*

A solution of 22 parts of potassium in 400 parts of absolute tert-butyl alcohol is diluted with 90 parts of dry toluene and then saturated at 5–10° C. with acetylene preliminarily dried over sulfuric acid, during 30 minutes. A solution of 22 parts of 7-methoxy-3a-methyl-3-oxo-3a,4,5,9b-tetrahydrobenz[e]indane in 360 parts of dry toluene is then introduced, following which, with continuous agitation, acetylene saturation is resumed for a 7-hour period, temperatures being maintained in the 5–10° range throughout. After standing overnight, the mixture is diluted with 1000 parts of ice water and then extracted with ether. The ether extract is washed with water and aqueous saline, dried over anhydrous sodium sulfate, and stripped of solvents by vacuum distillation. The residue, crystallized from hexane, melts at 125.5–127.5° C., with slight sintering at 123° C. The material thus obtained is 3-ethynyl-3-hydroxy-7-methoxy-3a-methyl-3a,4,5,9b-tetrahydrobenz[e]indane, of the formula

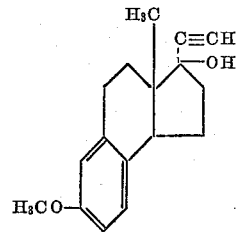

EXAMPLE 2

*3-carboxyethynyl-3-hydroxy-7-methoxy-3a-methyl-3a,4,5,9b-tetrahydrobenz[e]indane*

To a solution of 5 parts of 3-ethynyl-3-hydroxy-7-methoxy-3a-methyl-3a,4,5,9b-tetrahydrobenz[e]indane in 90 parts of freshly distilled tetrahydrofuran is added 15 parts of methyl-magnesium bromide dissolved in 30 parts of anhydrous ether. The resultant mixture is heated at the boiling point of the solvent under reflux, with agitation and in an atmosphere of nitrogen, for 24 hours. The mixture is then cooled to room temperatures and maintained thereat under an atmosphere of carbon dioxide, with vigorous agitation, for an additional 24 hours. The resultant material is poured into 600 parts of water containing 37 parts of concentrated sulfuric acid, and the mixture thus obtained is extracted with ether. The ether extract is washed with water, dried over anhydrous sodium sulfate, and stripped of solvent by distillation. The residue is taken up in 25 volumes of boiling ether, and this solution is diluted with half again its volume of carbon tetrachloride. Solvent is distilled off until the vapor temperatures reach 70° C., following which the concentrate is chilled to assist in the complete precipitation of a white powdery product found to melt in the range 170–175° C. Recrystallization from acetonitrile affords pure 3-carboxyethynyl-3-hydroxy-7-methoxy-3a-methyl-3a,4,5,9b-tetrahydrobenz[e]indane, the melting point of which is 173–175°. The product has the formula

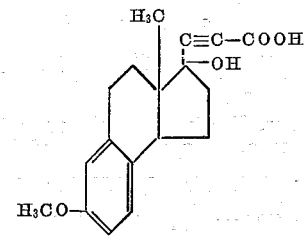

A suspension of 5 parts of the foregoing methoxyl compound in 125 parts of dry chlorobenzene, heated for 2 hours with 10 parts of aluminum chloride at 55–60° C. during vigorous agitation, affords the corresponding diol, 3-carboxyethynyl-3,7-dihydroxy-3a-methyl-3a,4,5,9b-tetrahydrobenz[e]indane, which is isolable upon pouring the reaction mixture into ice water, removal of chlorobenzene by steam distillation, extraction of the residue with boiling ether, drying of the extract with anhydrous sodium sulfate, and stripping of ether by evaporation.

EXAMPLE 3

*3-(2-carboxyvinyl)-3-hydroxy-7-methoxy-3a-methyl-3a,4,5,9b-tetrahydrobenz[e]indane lactone*

A mixture of 5 parts of 3-carboxyethynyl-3-hydroxy-7-methoxy-3a-methyl-3a,4,5,9b-tetrahydrobenz[e]indane, 1 part of Lindlar catalyst (i.e., lead-treated palladium on calcium carbonate, according to Helv. Chim. Acta, loc. cit.), and 100 parts of absolute alcohol is agitated under a hydrogen atmosphere until the theoretical uptake of hydrogen is complete. The mixture is then freed of catalyst by filtration and stripped of solvent by vacuum distillation, leaving as the residue, 3-(2-carboxyvinyl)-3-hydroxy-7-methoxy-3a-methyl-3a,4,5,9b - tetrahydrobenz[e]indane lactone, having the formula

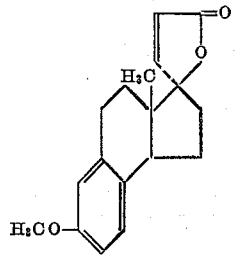

EXAMPLE 4

(A) *3-(2-carboxyethyl)-3-hydroxy-7-methoxy-3a-methyl-3a,4,5,9b-tetrahydrobenz[e]indane lactone*

A solution of 4 parts of 3-carboxyethynyl-3-hydroxy-7-methoxy-3a-methyl-3a,4,5,9b-tetrahydrobenz[e]indane in 40 parts of absolute alcohol containing 2 parts of triethylamine is agitated in the presence of 1 part of 5% palladium on charcoal under 1 atmosphere of hydrogen until absorption ceases. Catalyst is then filtered out, and to the residue is added a mixture of 5 parts of muriatic acid diluted with 5 parts of water. After 5 minutes, this mixture is poured into 500 parts of water; and the granular white solid which precipitates is recovered upon a filter. This material is 3-(2-carboxyethyl)-3-hydroxy-7-methoxy - 3a - methyl-3a,4,5,9b-tetrahydrobenz[e]indane lactone which, recrystallized from a mixture of ethyl acetate and isopropyl ether, melts at 115° C. The product has the formula

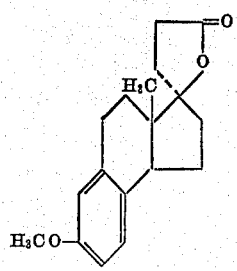

(B) *3-(2-carboxyethyl)-3-hydroxy-7-methoxy-3a-methyl-3a,4,5,9b-tetrahydrobenz[e]indane sodium salt*

To 38 parts of 3-(2-carboxyethyl)-3-hydroxy-7-methoxy-3a-methyl-3a,4,5,9b-tetrahydrobenz[e]indane lactone (unrecrystallized) dissolved in 600 parts of methyl alcohol is added 6 parts of caustic soda dissolved in 100 parts of water. The resultant pale yellow solution is concentrated to ⅔ volume by distillation at atmospheric pressures, following which the remaining solvent is distilled in vacuo. The granular white residue is 3-(2-carboxyethyl)-3-hydroxy-7-methoxy-3a-methyl - 3a,4,5,9b - tetrahydrobenz[e]indane sodium salt.

EXAMPLE 5

*3-(2-carboxyethyl)-3-hydroxy-3a-methyl-7-oxo-3a,4,5,7,8,9,9a,9b-octahydrobenz[e]indane lactone*

The product of the preceding Example 4B is suspended in a mixture of 600 parts of tert-butyl alcohol and 675 parts of tetrahydrofuran. To this suspension, under reflux and with vigorous agitation, is added 1400 parts of liquid ammonia, followed rapidly by 23 parts of lithium wire. The resultant deep blue solution—containing oily bronze lithium-ammonia amalgam—decolorizes spontaneously after roughly 3 hours, whereupon 160 parts of methyl alcohol is added and the ammonia allowed to evaporate. Approximately 1000 parts of water is introduced, and the resultant mixture is subjected to vacuum distillation until formation of a gelatinous precipitate occurs. At this point, distillation is stopped and the precipitate is suspended in a mixture of 400 parts of acetic acid and 5000 parts of water. The finely divided white solid obtained is filtered from the suspension, rinsed with water, and pressed as dry as possible. It is taken up in a mixture of 1600 parts of methyl alcohol, 214 parts of muriatic acid, and 200 parts of water. This solution is let stand at room temperatures for 4 hours, then diluted with 10,000 parts of water. The resultant mixture is extracted with chloroform; and the chloroform extract is washed with water, dried over anhydrous sodium sulfate, and stripped of solvent by vacuum distillation. The residual pale yellow oil crystallizes on standing. It is suspended in 350 parts of ether, then filtered therefrom and crystallized from 35 parts of ethyl acetate, decolorizing charcoal being used during the crystallizing process. The dense white crystals which result melt at 155–156° C. The product thus obtained is 3-(2-carboxyethyl)-3-hydroxy-3a-methyl - 7 - oxo-3a,4,5,7,8,9,9a,9b-octahydrobenz[e]indane lactone, the formula of which is

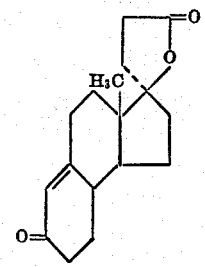

What is claimed is:
1. A compound selected from the group consisting of compounds of the formula

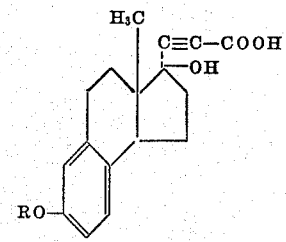

compounds of the formula

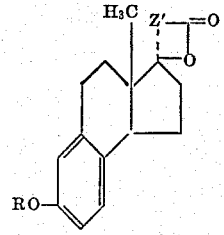

and a compound of the formula

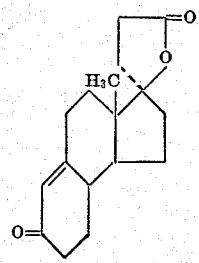

wherein R is selected from the group consisting of hydrogen and lower alkyl radicals, and Z' is selected from the group consisting of vinylene and ethylene radicals.

2. 3 - carboxyethynyl-3-hydroxy-7-methoxy-3a-methyl-3a,4,5,9b-tetrahydrobenz[e]indane.

3. 3-(2-carboxyvinyl)-3-hydroxy-7-methoxy-3a-methyl-3a,4,5,9b-tetrahydrobenz[e]indane lactone.

4. 3-(2-carboxyethyl)-3-hydroxy-7-methoxy-3a-methyl-3a,4,5,9b-tetrahydrobenz[e]indane lactone.

5. 3-(2-carboxyethyl)-3-hydroxy-3a-methyl-7-oxo-3a,4,5,7,8,9,9a,9b-octahydrobenz[e]indane lactone.

6. As an intermediate to the products defined by claim 1, 3-ethynyl-3-hydroxy-7-methoxy-3a - methyl - 3a,4,5,9b-tetrahydrobenz[e]indane.

No references cited.